US008676831B2

(12) United States Patent
Wieser et al.

(10) Patent No.: US 8,676,831 B2
(45) Date of Patent: Mar. 18, 2014

(54) MASTER PATTERN GENERATION AND UTILIZATION

(75) Inventors: Oswald Wieser, Schwetzingen (DE); Christoph Kernke, Einhausen (DE); Martin Guenther, Karlsdorf-Neuthard (DE)

(73) Assignee: SAP AG, Walldorf (DE)

( * ) Notice: Subject to any disclaimer, the term of this patent is extended or adjusted under 35 U.S.C. 154(b) by 2087 days.

(21) Appl. No.: 11/393,739

(22) Filed: Mar. 31, 2006

(65) Prior Publication Data
US 2007/0239679 A1    Oct. 11, 2007

(51) Int. Cl.
*G06F 17/30*    (2006.01)
(52) U.S. Cl.
CPC ................. *G06F 17/30398* (2013.01)
USPC .......................................... 707/769; 707/713
(58) Field of Classification Search
CPC .................................................. G06F 17/30398
USPC .................... 707/3, 104.1, 769, 713; 704/500
See application file for complete search history.

(56) References Cited

U.S. PATENT DOCUMENTS

| 2004/0204858 | A1* | 10/2004 | Brumbaugh | 702/13 |
| 2005/0102323 | A1* | 5/2005 | Henderson et al. | 707/104.1 |
| 2007/0059770 | A1* | 3/2007 | Anderson et al. | 435/7.1 |
| 2007/0129952 | A1* | 6/2007 | Kenyon et al. | 704/500 |
| 2008/0016074 | A1* | 1/2008 | Ben-dyke et al. | 707/7 |
| 2008/0059438 | A1* | 3/2008 | Day et al. | 707/3 |

* cited by examiner

*Primary Examiner* — Shahid Alam
(74) *Attorney, Agent, or Firm* — Finnegan, Henderson, Farabow, Garrett & Dunner, LLP

(57) ABSTRACT

A master pattern is identified in a target database for use as a template for data entry. The target database is qualified based on one or more database prerequisites. A plurality of similarity patterns is generated based on comparisons of records in the target database. These similarity patterns may be qualified and consolidated based on one or more pre-configured pattern significance guidelines to produce broad and unique patterns that may be used as master patterns. The master patterns may be recommended to the user during data entry in the target database.

15 Claims, 8 Drawing Sheets

FIG. 1

| PRODUCT NAME | MANUFACTURING LOCATION | PRICE | PRICING TYPE | SHIPPING PORT | BUYER NAME | BUYER LOCATION | DELIVERY DATE |
|---|---|---|---|---|---|---|---|
| PROD 1 | GERMANY | 10 | FOB | MUNICH | BUYER 2 | CANADA | 1/7/05 |
| PROD 2 | GERMANY | 11 | FOB | MUNICH | BUYER 1 | USA | 1/1/05 |
| PROD 3 | ENGLAND | 12 | FOB | DOVER | BUYER 3 | USA | 1/17/05 |

FIG. 2

| PRODUCT NAME | MANUFACTURING LOCATION | PRICE | PRICING TYPE | SHIPPING PORT | BUYER NAME | BUYER LOCATION | DELIVERY DATE |
|---|---|---|---|---|---|---|---|
| PROD 1 | GERMANY | 10 | FOB | MUNICH | BUYER 2 | CANADA | 1/7/05 |
| PROD 2 | GERMANY | 11 | FOB | MUNICH | BUYER 1 | USA | 1/1/05 |
| PROD 3 | ENGLAND | 12 | FOB | DOVER | BUYER 3 | USA | 1/17/05 |
| PROD 1 | GERMANY | 10 | FOB | MUNICH | BUYER 4 | SPAIN | 1/12/05 |
| PROD 1 | GERMANY | 10 | FOB | MUNICH | BUYER 5 | ENGLAND | 1/17/05 |
| PROD 1 | GERMANY | 10 | FOB | MUNICH | BUYER 6 | GERMANY | 1/9/05 |
| PROD 1 | GERMANY | 10 | FOB | MUNICH | BUYER 7 | FRANCE | 1/11/05 |
| PROD 1 | GERMANY | 10 | FOB | MUNICH | BUYER 8 | MEXICO | 1/6/05 |

TEST RECORD

| PRODUCT NAME | MANUFACTURING LOCATION | PRICE | PRICING TYPE | SHIPPING PORT | BUYER NAME | BUYER LOCATION | DELIVERY DATE |
|---|---|---|---|---|---|---|---|
| PROD 1 | GERMANY | 10 | FOB | MUNICH | BUYER 1 | USA | 1/1/05 |

402

COMPARISON RECORDS

| PRODUCT NAME | MANUFACTURING LOCATION | PRICE | PRICING TYPE | SHIPPING PORT | BUYER NAME | BUYER LOCATION | DELIVERY DATE |
|---|---|---|---|---|---|---|---|
| PROD 1 | GERMANY | 10 | FOB | MUNICH | BUYER 2 | CANADA | 1/7/05 |
| PROD 2 | GERMANY | 11 | FOB | MUNICH | BUYER 1 | USA | 1/1/05 |
| PROD 3 | ENGLAND | 12 | FOB | DOVER | BUYER 3 | USA | 1/17/05 |

404 406 408

SIMILARITY PATTERN

| 1 | 1 | 1 | 1 | 1 | 0 | 0 | 0 |
|---|---|---|---|---|---|---|---|
| 0 | 1 | 0 | 1 | 0 | 1 | 1 | 1 |

| PATTERN | OCCURRENCE | AS | PS | % PATTERN | ID |
|---|---|---|---|---|---|
| 11111000 | 35 | 5 | 175 | 31.79 | B150217 |

MASTER PATTERN GENERATION AND UTILIZATION

TECHNICAL FIELD

The field of the invention relates in general to entry and management of data records in databases. More particularly, the field of the invention relates to using pattern analysis to identify master patterns that may be used as templates for data entry in a target database.

BACKGROUND

With the rapid advance in computer technologies, electronic data storage has become the norm today. Tremendous amounts of data of various sorts are now being kept in increasing complex electronic databases. Electronic data records are much more user friendly in terms of creation, modification, classification, search, and many other aspects, than the traditional paper records. However, when the number of data fields in an electronic data record is large and the need for data entry is frequent, entry of an electronic data record may become burdensome for a user. It may be especially frustrating when many fields of the electronic data records are redundant in the database, and the user is required to re-enter such information repetitiously.

For example, in a database containing invoice records of a seller, the same product names, descriptions, prices, delivery options, and many other product attributes may repeat in various records. At present, the same information must be entered by a user each time a new invoice record is created in the database. Such repetitious data entry is not only time consuming, but may also introduce errors and/or inconsistencies of the same information in different data records.

Some efforts have been made to reduce the user's burden in repetitious and redundant data entries during the record creation process. As an example, some data entry applications provide input suggestions during data entry for specific data fields, for example, based on frequency of prior usage specific to that field. This type of suggestion may be useful on an individual field basis when the number of entry choices for a particular field is limited. However, when the entry choices for a field become large, the usefulness of such suggestions diminishes. This type of field-based suggestions also does not take into account any relationships between the fields and, therefore, fails to provide the user with a comprehensive suggestion for a data record that involves a large number of data fields.

In view of the above, a need exists for an improved way of facilitating entry of data records in a database, where the most broad and appropriate suggestions applicable to a particular record may be provided to minimize user effort in entering redundant data.

SUMMARY

Consistent with the principles of the present invention, a method and system for identifying a master pattern in a target database, which may be used as a template for data entry in the target database, is provided. The target database may be one or more database tables and may be qualified based on one or more database prerequisites. The prerequisites may include specification of the minimum number of attributes in a record, the minimum number of records in the database, and/or any other database-specific characteristics. One or more pattern significance guidelines may be configured. The pattern significance guidelines may include attribute significance, which may specify the minimum number of attributes that a pattern must include, row significance, which may specify the minimum number of records in which the pattern must occur, pattern significance, which may specify the minimum total number of attributes that must be associated with the pattern in the target database, and/or any other suitable guidelines for determining the significance of a pattern in the target database.

A plurality of similarity patterns may be generated based on comparisons of records in the target database. When conducting the comparisons, a record in the target database may be designated as a test record. Every other record in the target database may be compared individually to the test record. A similarity pattern may be generated if similarities between the test record and a comparison record exceed at least one of the one or more pattern significance guidelines described above. The comparisons and similarity pattern generations may be repeated until each record in the target database has served as a test record and compared to all other records in the target database.

Once the plurality of similarity patterns have been generated, the similarity patterns may be compared to each other and consolidated to generate at least one unique master pattern, for example, based on at least one of the one or more pattern significance guidelines. In one suitable arrangement, duplicated similarity patterns may be eliminated so only unique similarity patterns remain. In another suitable arrangement, similarity patterns may be compared to each other and if one pattern is determined as being included in another, the included pattern may be eliminated. Any other suitable consolidation and/or elimination processes may be carried out to ensure that only the broadest and the unique similarity patterns remain after the consolidation process. One or more of the similarity patterns remaining after the consolidation process may be used as master patterns or templates for facilitating new data record entry in the target database.

Consistent with the principles of the present invention, master patterns, such as the ones determined according to the process above, may be selected into a user's preferred master list and may be recommended to the user during entry of a database record. Prior to the recommendation, a user request for master patterns may be received, for example, during database management, during data entry, or in any other suitable situation. In response to receiving the user request, a list of available master patterns may be provided to the user. The list of available master patterns may include some or all of the master patterns that have been identified, for example, in connection with a target database to which the user is currently attempting to add a data record, some or all of the master patterns that are generally available for facilitating data entries in all suitable databases, or any other suitable sets of master patterns.

The user may be allowed to select at least one master pattern from the available master patterns to form a preferred master pattern list. The user selection of the master pattern may be restricted, for example, based on the user's identity, the type of data entry, and/or any other combination of criteria. Once selected, a master pattern from the user's preferred list may be recommended to the user to create a database record.

Consistent with the principles of the present invention, a predetermined master pattern may be recommended to the user when the user is about to create a new database record in a target database. In response to the request, at least one pre-determined master pattern may be recommended to the user. The pre-determined master pattern may include, for example, all master patterns that are available for use as templates for data entry in one or more databases, master patterns that the user is authorized to use based on the user's identity, master patterns that the user has previously used, master patterns that are suitable for use with those databases that the user is authorized or has frequently used, or any other suitable master patterns that are available for recommendation to the user based on any combination of criteria. The user may select a master pattern from the at least one recommended master pattern to create the database record.

Consistent with the principles of the present invention, a master pattern may be recommended to the user based on partial data input during entry of a new data record. The selection of the master pattern for recommendation may be based on a comparison of the inputted data with data in the one or more master patterns that are available for recommendation.

Further features and embodiments of the present invention will become apparent from the description and the accompanying drawings. It will be understood that the features mentioned above and those described hereinafter may be used not only in the combination specified but also in other combinations or on their own, without departing from the scope of the present invention. It will also be understood that the foregoing background, summary, and the following description of the systems consistent with the principles of the present invention are in no way limiting on the scope of the present invention and are merely illustrations of a preferred embodiment of the present invention.

BRIEF DESCRIPTION OF THE DRAWINGS

Referring now to the drawings, in which like numerals represent like elements throughout the several Figures, aspects of the present invention and the exemplary operating environment will be described.

FIG. 1 is a table showing an exemplary trivial pattern in a target database consistent with the principles of the present invention;

FIG. 2 is a table showing an exemplary potentially significant pattern in a target database consistent with the principles of the present invention;

FIG. 4 shows exemplary similarity patterns and the records from which they were generated consistent with the principles of the present invention;

FIG. 5 shows an exemplary similarity pattern summary consistent with the principles of the present invention;

DETAILED DESCRIPTION

Figure 3:
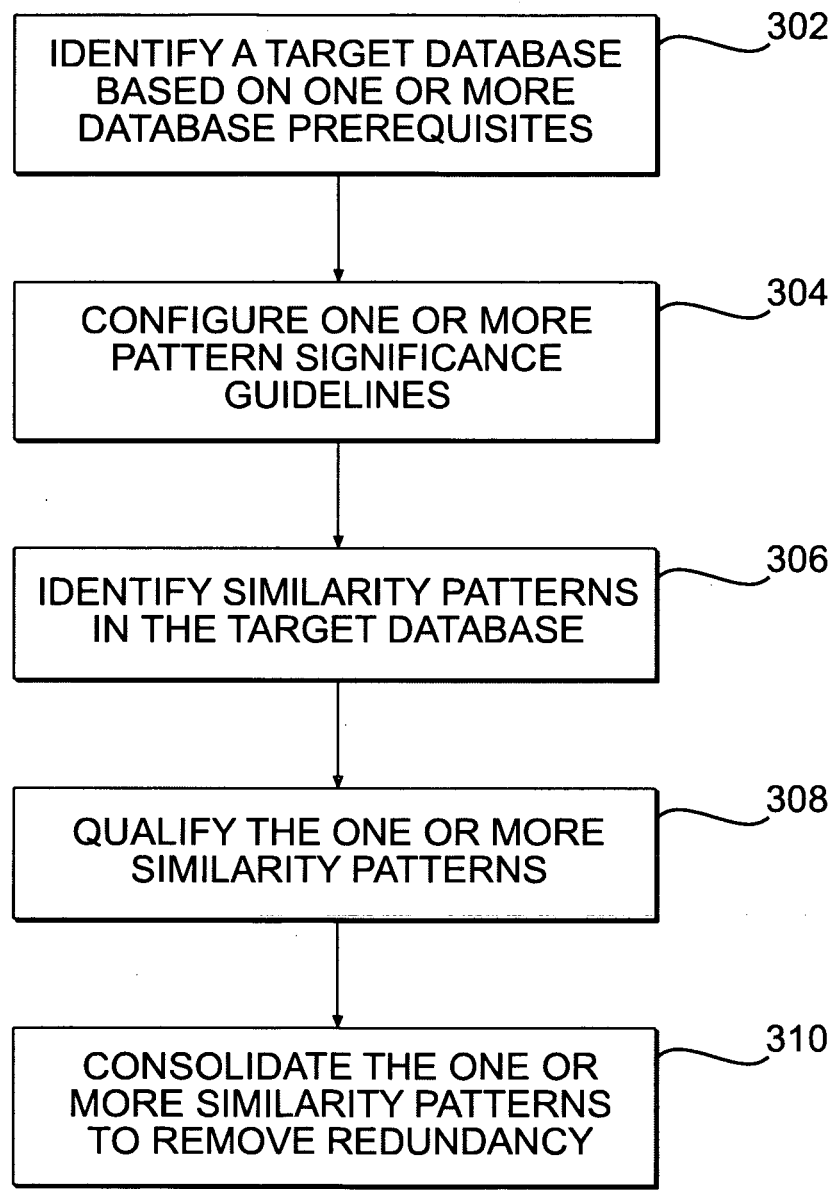
FIG. 3 is a flow chart of illustrative stages involved in identifying one or more similarity patterns that may be used as master patterns in a target database consistent with the principles of the present invention.

The following detailed description refers to the accompanying drawings. Wherever possible, the same reference numbers are used in the drawings and the following description to refer to the same or similar parts. While several exemplary versions and features of the invention are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering or adding stages to the disclosed methods. Accordingly, the following detailed description does not limit the invention. Instead, the proper scope of the invention is defined by the appended claims.

Consistent with the principles of the present invention, master patterns may be identified to provide templates for facilitating and streamlining data entry and management. A master pattern may comprise a set of attributes, which may be, for example, extracted from data records stored in one or more database tables residing in one or more database structures. For simplicity, the one or more database tables are collectively referred to below as a target database. Extraction may occur according to a pattern recognition algorithm or any other suitable pattern detection procedure, hereinafter collectively referred to as pattern recognition algorithm.

FIG. 1 illustrates an exemplary target database table 100. Rows in the table contain data records, with each cell corresponding to a data field. The data records in this example correspond to invoicing details for commercial transactions. Columns in table 100 correspond to categories or groups of information, as indicated by the title names in the header raw. In particular, the first column of data fields identifies the individual products, while the second column identifies where the respective product was manufactured.

Consistent with the principles of the present invention, the pattern recognition algorithm may analyze suitable data records in a target database to detect similarities and relationships among the data record attributes. These detected similarities and relationships may then be used by the pattern recognition algorithm to identify and/or derive patterns. These identified patterns may include both significant and trivial patterns.

A trivial pattern may be, for example, an attribute that has a reoccurrence rate in the data records beyond an established threshold. As an example and in reference to FIG. 1, a trivial pattern may include a reoccurring country attribute such as "Germany," which may appear repeatedly in the database records (i.e., 102 and 104) so that a predetermined threshold, such as a percentage occurrence threshold is exceeded. While a trivial pattern may be telling of a specific attribute's frequency of occurrence in the database, it typically does not shed light on the attribute's relationships with other attributes in any particular database record.

The pattern recognition algorithm, however, may also detect significant patterns in the data records of a target database. A significant pattern may include a set of related attributes, which may reoccur throughout the target database in a specific combination. As an example, a significant pattern may be identified when a combination of a certain predetermined percentage (i.e., 40%) of the attributes of a data record reoccurs in a predetermined percentage (i.e., 30%) of the total data records in the one or more targeted databases. This detected pattern may be considered significant because knowledge of one attribute in the pattern has a high probability of predicting the value of at least one of the other attributes in the combination.

One such potentially significant pattern 204 may be seen in the sample target database table FIG. 2, which is similar in composition to table 100 of FIG. 1. In this example, the product name, manufacturing location, price, and shipping port are repeated in five different records 204. This type of potentially significant pattern may be used in the identification of a master pattern, which will be discussed in more details below.

Consistent with the principles of the present invention, a pattern analysis algorithm and/or analysis stages may be followed in identifying master patterns in a target database. FIG. 3 is a flowchart showing such a pattern analysis method having an exemplary set of processing stages. At stage 302, a target database may be identified, for example, as a database that is suitable for master pattern analysis based on one or more database prerequisites. The database prerequisites may be predetermined and may include requirements such as the minimum number of records in a database, the minimum number of database table rows, the minimum number of total attributes, the existence of data record identifiers, and any other requirements for identifying a suitable target database in which potentially significant patterns may be identified.

At step 304, one or more pattern significance guidelines may be configured. A pattern significance guideline may be a rule and/or threshold that establishes a baseline for determining the potential significance of a pattern detected in the target database. Occurrences in the target database that exceed the one or more pattern significance guidelines would qualify the data as a potential pattern of significance.

A suitable pattern significance guideline may specify, for example, an attribute significance, a row significance, or a pattern significance. An attribute significance would indicate the minimum number of attributes that a pattern must include. A row significance may indicate the minimum number of table rows that a pattern must appear in. A pattern significance may specify a minimum pattern occurrence in the target database by calculating total pattern occurrence in the entire target database. These pattern significance guidelines are merely exemplary. Any other suitable thresholds and/or rules may be configured without exceeding the scope of the present invention.

At stage 306, similarity patterns, which will be described in more detail below, may be identified in the target database. As an example, pattern recognition algorithm may be used to compare the data records in the target database to detect patterns.

In one suitable arrangement in accordance with stage 306, a specific data record in the target database may be designated as a test record to which all other data records in the target database, hereinafter referred to as comparison records, may be individually compared. If similarities between a comparison record and the test record exceed a predetermined threshold, such as an attribute significance threshold described above, a similarity pattern may be created. The similarity pattern may indicate similarities between the above comparison record and the test record. Examples of such similarity patterns are shown in FIG. 4 along with the test record and the comparison records associated with the similarity patterns. In this example, test record 402 may be, for example, the first record in the target database and the comparison records 404-408 may be the subsequent records immediately following the test record in the target database. The similarity patterns 410 and 412 include as many attribute columns as the comparison and test records. In this case, similarity pattern 410 is a sequence that represents the similarities between test record 402 and comparison record 404. A similarity detected between an attribute of comparison record 404 and a corresponding attribute of test record 402 is denoted with a "1" in similarity pattern 406. A lack of similarity in like attributes of comparison record 404 and test record 402 is denoted with a "0" in similarity pattern 406.

In the above described fashion, similarity pattern 412 may also be created to indicate the similarities between test record 402 and comparison record 406. In this way, each comparison record may be compared to the test record in the target database in turn. It will be understood that while a comparison may be carried out between the test record and every other comparison record in the target database, creation of similarity patterns in connection with that test record may result from only some of these comparisons. More specifically, in some embodiments, creation of a similarity pattern may be limited to only those instances in which similarities between the test record and the comparison record exceed a predetermined threshold, such as when the number of similar attributes exceeds a predetermined attribute significance. Any other suitable threshold or criteria may be used to restrict the creation of similarity patterns without departing from the spirit of the present invention.

The above process may be repeated until each record in the target database has been used as a test record and compared to all other records in the target database. The total number of comparisons that are required to create a complete list of similarity patterns, which takes into account similarities between every record in the target database, may be calculated by squaring the total number of data records in the target database. The resulting number of similarity patterns may be less than the calculated number of comparisons as some comparisons are ignored because the similarities failed to exceed one or more predetermined thresholds such as the attribute significance threshold. It will be understood that the above method for creating a list similarity patterns in a target database is merely illustrative. Any other suitable methods may be used without departing from the spirit of the present invention.

A pattern qualification stage 308 may be performed to further eliminate insignificant similarity patterns after the establishment of the similarity patterns for the target database at stage 306. As an example, during this pattern qualification stage 308, duplicate similarity patterns may be identified and the duplicated pattern's total number of occurrences may be calculated. If the calculated occurrence rate of a particular similarity pattern, for example, fails to exceed a suitable threshold such as a row significance configured at stage 304, which specifies the minimum number of times that a similarity pattern must occur in order to be considered significant, all instances of that similarity pattern may be eliminated at stage 308. Any other suitable thresholds or criteria may be used to eliminate some of the similarity patterns at stage 308 without departing from the spirit of the present invention.

For each group of distinct similarity patterns that remains, a pattern summary or other suitable documentation may be generated as a final step in qualification stage 308. One example of such a summary is shown in FIG. 5. This summary may include the unique similarity pattern 410, the number of its occurrence in the target database, the number of involved attributes in a database record 502, the calculated pattern significance 504, and any other suitable information related to the similarity pattern. The example in FIG. 5 indicates that the similarity pattern, which was described above as pattern 410 in FIG. 4, has occurred 35 times in the target database, has an attribute significance of 5, meaning that the similarity pattern involves 5 attributes of a data record, has a pattern significance 504 of 175, which is calculated by multiplying attribute significance 502 by the number of occurrences, and has a % pattern of 31.79%, which is calculated by dividing pattern significance 504 by the total number of attributes in the target database. In some embodiments, the pattern summary may also include a pattern identifier 508. It will be understood that the pattern summary of FIG. 5 is merely illustrative. Any other suitable summary may be generated without departing from the spirit of the present invention.

In this way, all repeating similarity patterns are grouped and summarized in stage 308. This removes the simple redundancies in the similarity patterns, but does not address other more complex redundancy issues such as when one broader similarity pattern includes a narrower similarity pattern. Pattern consolidation stage 310 may be performed to address such more complex redundancies consistent with the principles of the present invention. As an example, in consolidation stage 310, summarized similarity patterns from stage 308 may be compared to each other to determine if one pattern contains or overlaps with another pattern. For example, if all positive similarities of one pattern are also found in another pattern, the two patterns' associated pattern significance may be compared. The pattern associated with the lower pattern significance may be eliminated as a result of this comparison. This comparison process may be repeated for each remaining summarized pattern. Once all summarized similarity patterns have been subjected to the above comparison and elimination, the similarity patterns that remain represent the distinct, significant, and non-redundant patterns that exist in the targeted database.

It will be understood that the above stages 302-310 for identifying distinct and significant patterns in a target database are merely illustrative. Stages may be added, removed, rearranged, or otherwise modified without departing from the spirit of the present invention.

Consistent with the principles of the present invention, at least one of the unique patterns identified in the above FIG. 3 may be implemented as a master pattern, which may be utilized as a template for facilitating new data record creation in the target database. Three suitable ways that a master pattern may be introduced as a template data entry will be discussed in connection with the flowcharts of FIGS. 6-8.

Figure 6:
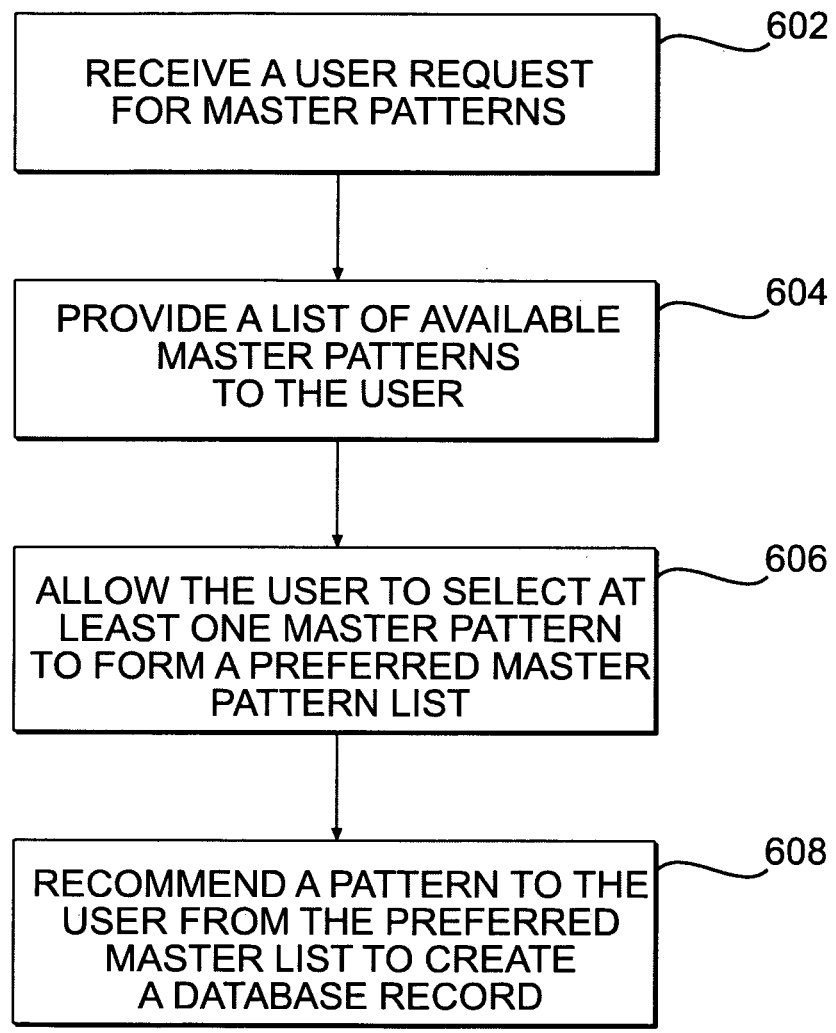
FIG. 6 is a flow chart of illustrative stages involved in allowing a user to create a preferred master pattern list consistent with the principles of the present invention.

In FIG. 6, a user may specifically request master patterns at stage 602. The user may make such a request, for example, using a request button on a data record entry interface or using any other suitable mechanism for making such a request. In response to the user request, a list of available master patterns may be provided to the user at stage 604. The available master patterns may include some or all of the master patterns that have been established, for example, in connection with a target database to which the user is currently attempting to add a data record, some or all of the master patterns that are generally available for facilitating data entries in all suitable databases, or any other suitable sets of master patterns.

The user may be allowed to select at least one master pattern to form a preferred master pattern list at stage 606 consistent with the principles of the present invention. The user selection of the master pattern may be restricted, for example, based on the user's identity, the type of data entry that a master pattern is intended to facilitate, and/or any other suitable combination of criteria.

In one suitable arrangement, the preferred master pattern list may be centrally stored in association with the user, for example, at a central database housing facility where the master patterns and/or databases also reside. In another suitable arrangement, the preferred master pattern list may be stored locally at a user facility or system. Local storage of the preferred master pattern list may additionally include local storage of the corresponding master patterns.

At stage 608, a master pattern may be recommended to the user from the preferred master list to create a database record consistent with the principles of the present invention. As an example, when the user initiates creation of a database record, the preferred master pattern list may be displayed to the user from which the user may choose the appropriate master pattern to use as the template for creating the database record. As another example, one or more master patterns from the user's preferred master pattern list may be recommended to the user, for example, based on frequency of prior usage, the type of data record entry the user has initiated, or any other suitable criterion or combination of criteria.

Figure 7:
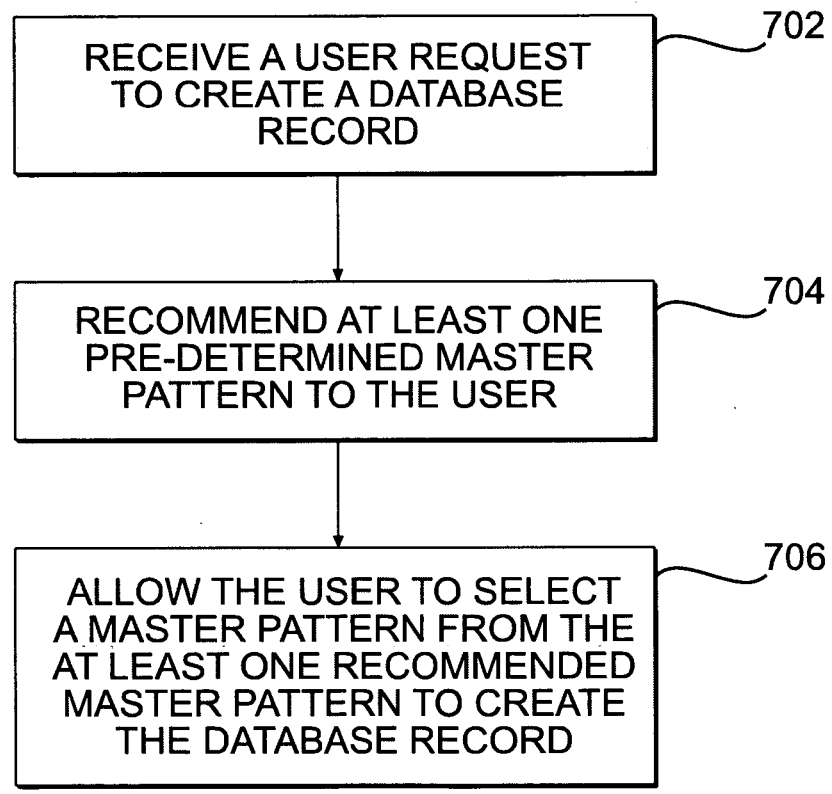
FIG. 7 is a flow chart of illustrative stages involved in recommending a pre-determined master pattern to the user consistent with the principles of the present invention.

FIG. 7 shows another suitable arrangement for recommending a master pattern to the user consistent with the principles of the present invention. At step 702, a user may request creation of a database record. At step 704, at least one pre-determined master pattern may be recommended to the user. The at least one pre-determined master pattern may include all master patterns that are available for use as templates for facilitating data entry in one or more databases, master patterns that the user is authorized to use based on the user's identity, master patterns that the user has previously used, master patterns that are suitable for use with those databases that the user is authorized to use or has frequently used, or any other suitable master patterns that are available for recommendation to the user based on any criterion or combination of criteria. At stage 706, the user is allowed to select a master pattern from the at least one recommended master pattern to create the database record.

Figure 8:
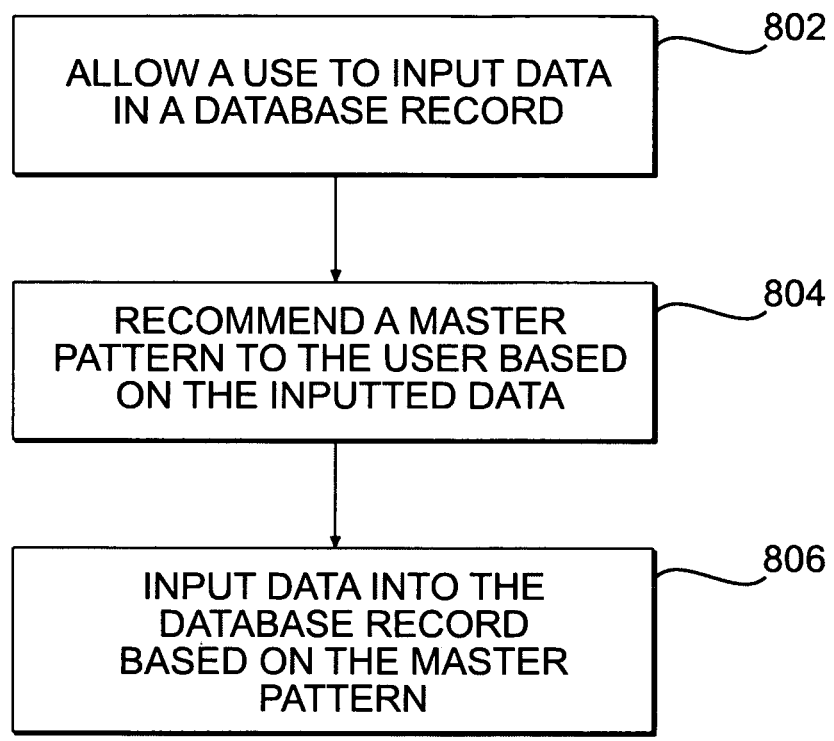
FIG. 8 is a flow chart of illustrative stages involved in recommending a master pattern to the user based on partially inputted data in a database record consistent with the principles of the present invention.

FIG. 8 shows yet another suitable arrangement for recommending a master pattern to the user. At stage 802, the user is allowed to input data in a database record. Based on at least some of the data inputted by the user, a master pattern may be recommended to the user. As an example, the selection of the master pattern for recommendation may be based on a comparison of the inputted data with data in the one or more master patterns that are available for recommendation. In some suitable arrangements, the master pattern recommendations may be made as soon as any inputted data matches any data found in a master pattern. In other suitable arrangements, a master pattern recommendation is only made when a pre-determined significant number of inputted data matches data in a master pattern. At stage 806, data may be inputted into the database record based on the recommended master pattern. In some suitable arrangements, the user may be provided with the option to allow or reject such input of data based on a master pattern. In some suitable arrangements, when more than one master pattern is recommended, the user may be allowed to select one or more master patterns to input data into the database record.

It will be understood that the stages of FIGS. 6-8 are merely illustrative of the stages that may be implemented in connection with recommending a suitable master pattern to the user consistent with the principles of the present invention. Stages may be added, removed, rearranged, or otherwise modified without departing from the spirit of the present invention.

A computer system may be used to install a software application implementing a system and method for generating and recommending a master pattern to assist data entry consistent with the principles of the present invention. The computer system may be a computer network, as shown in FIG. 9, or a stand-alone personal computer (PC), as shown in FIG. 10.

Figure 9:
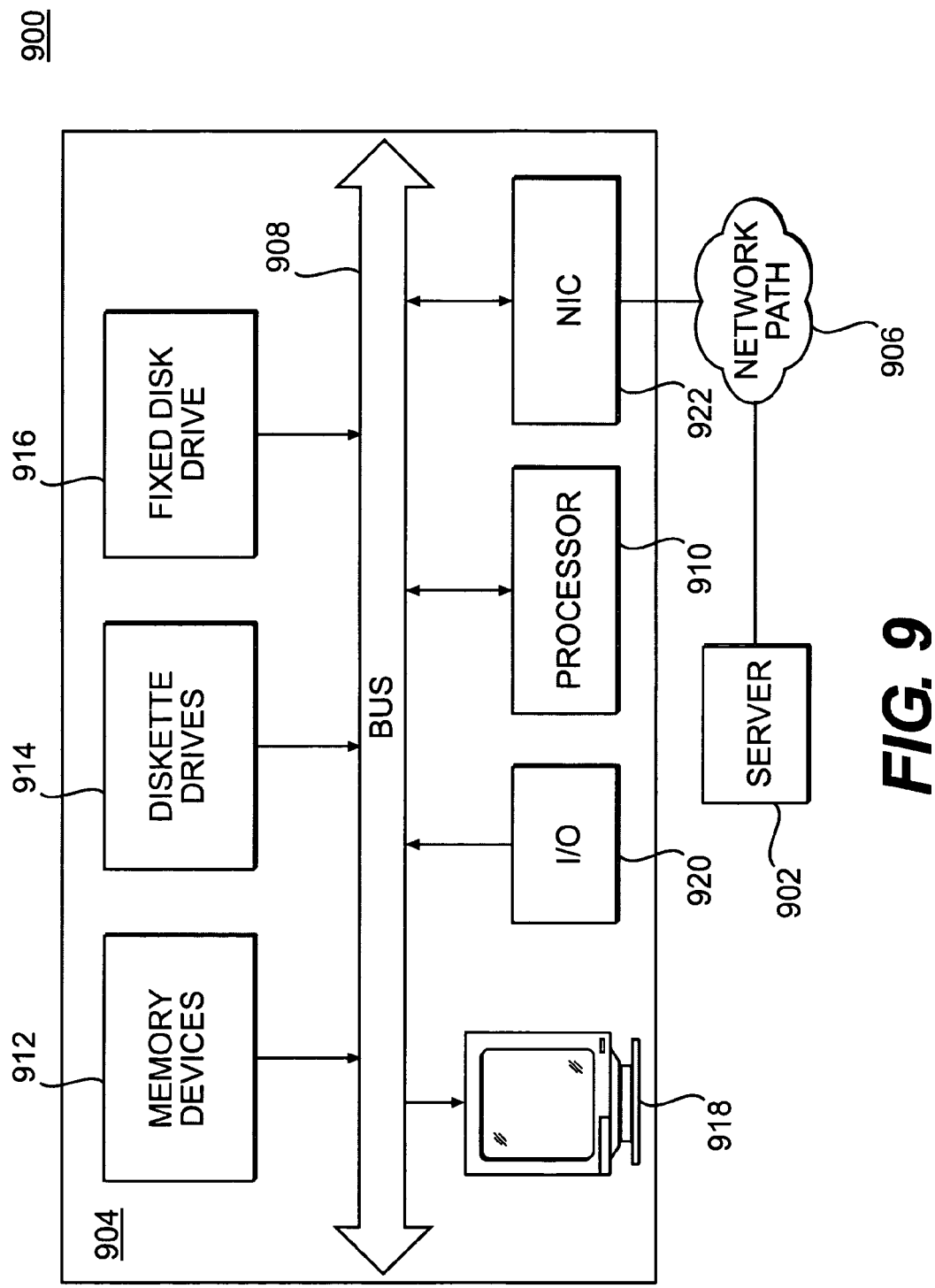
FIG. 9 is a block diagram of an illustrative computer system for implementing a software application consistent with the principles of the present invention.
Figure 10:
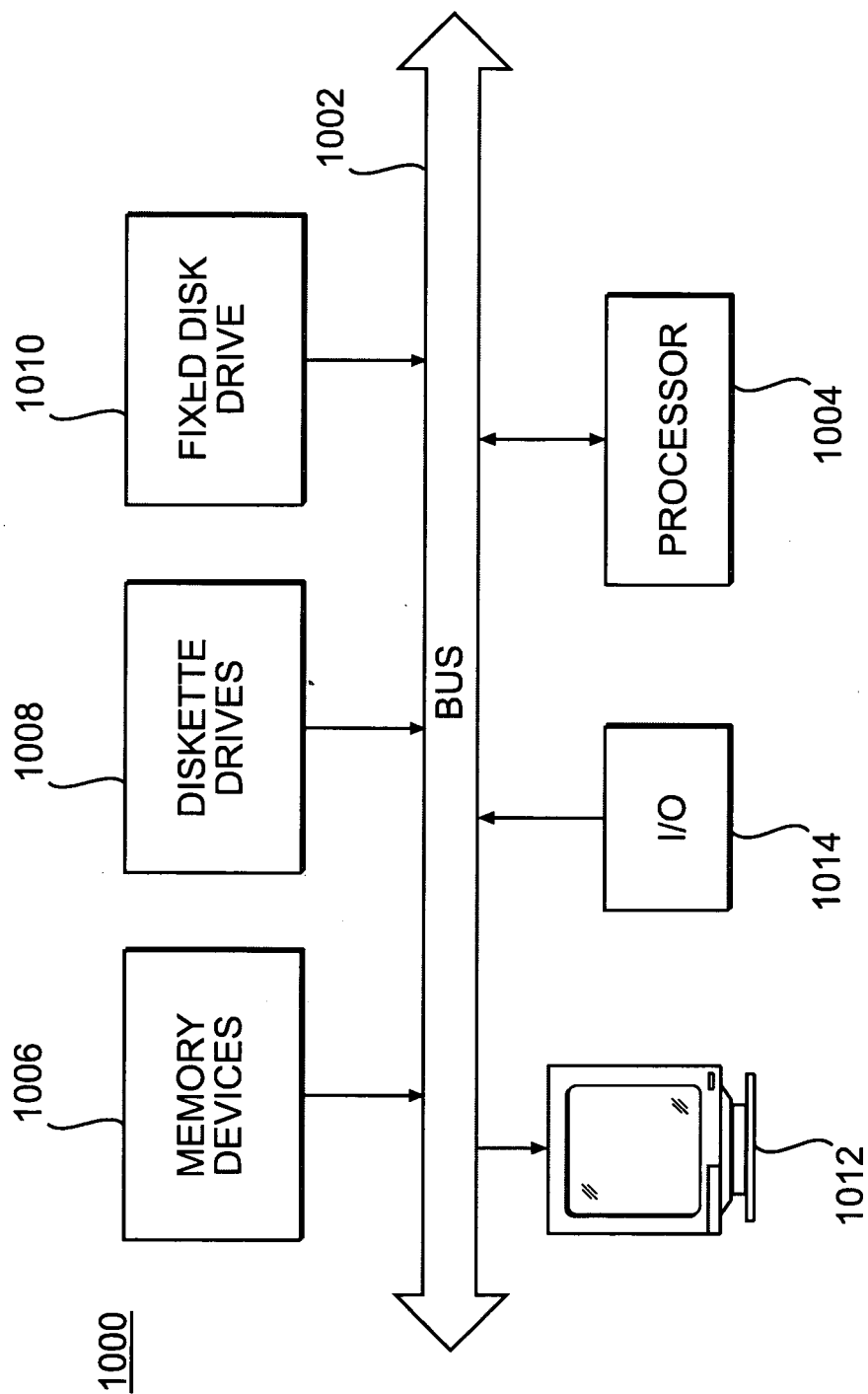
FIG. 10 is a block diagram of another illustrative computer system for implementing a software application consistent with the principles of the present invention.

As shown in FIG. 9, a computer network 900 in accordance with systems consistent with the principles of the present invention may include a server 902 and a stand-alone PC 904 connected through a network path 906. Computer network 900 may be a local area network (LAN), where server 902 and PC 904 are workstations. Computer network 900 may also be the Internet, with server 902 hosting a web application and PC 904 being any workstation available to a user desiring to interface with the application on server 902. Alternatively, computer network 900 may be a wide area network (WAN), and server 902 and PC 904 may lie in two separate LANs connected through the Internet.

PC 904 may include a bus line 908 connecting a plurality of devices such as a processor 910, memory devices 912 for storage of information, diskette drives 914, a fixed disk drive 916, a monitor or display 918, other I/O devices 920, and a network interface card (NIC) 922. Processor 910 may be a microprocessor such as an Intel Pentium™ chip for processing applications. Memory devices 912 may include read-only memories (ROM) and/or random access memories (RAM). Diskette drives 914 may include a floppy drive and/or a compact disk (CD) drive. Fixed disk drive 916 may be a hard drive. I/O devices 920 may include a keyboard and/or a mouse for receiving input from a user of PC 904. Monitor or display 918 may display output from processor 910, and may also echo the input of the user. PC 904 may be connected to network path 906 through NIC 922.

A web application may be installed on server 902. An individual desiring to enter data into the application on server 902 may use a web browser loaded on PC 904, and may communicate with server 902 through NIC 922 and network path 906. In one aspect, software application for implementing a system consistent with the principles of the present invention may be stored in PC 904 and processor 910 of PC 904 may execute the software application locally within PC 904 and interface with a web application on server 902. Particularly, the software application may be stored on a floppy disk, a CD, or any other suitable readable media, which may be accessible by diskette drive 914, fixed disk drive 916, or any other suitable mechanism. In another aspect, the software application for implementing a system consistent with the principles of the present invention may be stored in server 902, which may execute the software application, and processor 910 of PC 904 may communicate with server 902 to send information to server 902 and retrieve the results of the execution of the software application from server 902.

Through the execution of the software application implementing a system consistent with the principles of the present invention, either locally within PC 904 or remotely within server 902, an interface or screen may be provided on a user display.

Alternatively, as shown in FIG. 10, a stand-alone PC 1000 may be used for implementing a software application implementing a system consistent with the principles of the present invention. PC 1000 may include a bus line 1002 connecting a plurality of devices, which may include a processor 1004, memory devices 1006 for storage of information, diskette drives 1008, a fixed disk drive 1010, a monitor or display 1012, and other I/O devices 1014. Processor 1004 may be a microprocessor such as an Intel Pentium™ chip for processing applications. Memory devices 1006 may include ROM and/or RAM. Diskette drives 1008 may include a floppy drive and/or a compact disk (CD) drive. Fixed disk drive 1010 may be a hard drive. Monitor or display 1012 may display the output of processor 1004 and may also echo the input of the user. I/O devices 1014 may include a keyboard and/or a mouse for receiving input from a user of PC 1000.

A software application implementing a system consistent with the principles of the present invention may be stored on a floppy disk or a CD accessible by diskette drive 1008 or on fixed disk drive 1010. Processor 1004 may execute the software application stored in the floppy disk the CD or the fixed disk drive 1010. An individual, through monitor or display 1012 and I/O devices 1014, may interact with processor 1004, which may execute the software application. A software application implementing a system consistent with the principles of the present invention may be written in any number of programming languages, including but not limited to JavaScript, Visual Basic, Flash, ABAP coding, or any other suitable language. Similarly, the present invention is not limited to use with certain applications, Internet browsers or operating systems.

Furthermore, the invention may be practiced in an electrical circuit comprising discrete electronic elements, packaged or integrated electronic chips containing logic gates, a circuit utilizing a microprocessor, or on a single chip containing electronic elements or microprocessors. The invention may also be practiced using other technologies capable of performing logical operations such as, for example, AND, OR, and NOT, including but not limited to mechanical, optical, fluidic, and quantum technologies. In addition, the invention may be practiced within a general purpose computer or in any other circuits or systems.

While the present invention has been described in connection with various embodiments, many modifications will be readily apparent to those skilled in the art. One skilled in the art will also appreciate that all or part of the systems and methods consistent with the present invention may be stored on or read from computer-readable media, such as secondary storage devices, like hard disks, floppy disks, and CD-ROM; a carrier wave received from a network such as the Internet; or other forms of ROM or RAM. Accordingly, embodiments of the invention are not limited to the above described embodiments and examples, but instead is defined by the appended claims in light of their full scope of equivalents.

What is claimed is:

1. A method for identifying a master pattern in a target database, the method comprising:
    identifying the target database based on at least one database prerequisite;
    configuring at least one pattern significance guideline;
    generating a plurality of similarity patterns based on comparisons of records in the target database, wherein the comparison includes serially designating each record in the target database as a test record and comparing the test record to all other records in the target database to generate the plurality of similarity patterns such that every single existing record in the target database serves as a test record at least once and the test record is compared to all of the other records in the target database; and
    consolidating the plurality of similarity patterns based on the at least one pattern significance guideline to generate at least one unique master pattern.

2. The method of claim 1, wherein consolidating the plurality of similarity patterns comprises eliminating a similarity pattern that is included in another similarity pattern.

3. The method of claim 1, wherein the at least one database prerequisite includes at least one of minimum records and minimum attributes per record.

4. The method of claim 1, wherein the at least one pattern significance guideline includes at least one of attribute significance, row significance, and pattern significance.

5. The method of claim 1, wherein generating the plurality of similarity patterns comprises:

repeating the designating, comparing, and generating until each record in the target database has been designated as the test record once.

6. A computer system for identifying a master pattern in a target database, the system comprising:
an I/O device;
a display; and
a processor configured to:
identify the target database based on at least one database prerequisite;
configure at least one pattern significance guideline;
generate a plurality of similarity patterns based on comparisons of records in the target database, wherein the comparison includes serially designating each record in the target database as a test record and comparing the test record to all other records in the target database to generate the plurality of similarity patterns such that every single existing record in the target database serves as a test record at least once and the test record is compared to all of the other records in the target database; and
consolidate the plurality of similarity patterns based on the at least one pattern significance guideline to generate at least one unique master pattern.

7. The system of claim 6, wherein the processor is further configured to consolidating the plurality of similarity patterns comprises eliminating a similarity pattern that is included in another similarity pattern.

8. The system of claim 6, wherein the at least one database prerequisite includes at least one of minimum records and minimum attributes per record.

9. The system of claim 6, wherein the at least one pattern significance guideline includes at least one of attribute significance, row significance, and pattern significance.

10. The system of claim 6, wherein the processor is further configured to:
repeat the designating, comparing, and generating until each record in the target database has been designated as the test record once.

11. A tangible computer-readable storage medium including instructions executable by a processor for performing a method for identifying a master pattern in a target database, the method comprising:
identifying the target database based on at least one database prerequisite;
configuring at least one pattern significance guideline;
generating a plurality of similarity patterns based on comparisons of records in the target database, wherein the comparison includes serially designating each record in the target database as a test record and comparing the test record to all other records in the target database to generate the plurality of similarity patterns such that every single existing record in the target database serves as a test record at least once and the test record is compared to all of the other records in the target database; and
consolidating the plurality of similarity patterns based on the at least one pattern significance guideline to generate at least one unique master pattern.

12. The computer-readable storage medium of claim 11, wherein consolidating the plurality of similarity patterns comprises eliminating a similarity pattern that is included in another similarity pattern.

13. The computer-readable storage medium of claim 11, wherein the at least one database prerequisite includes at least one of minimum records and minimum attributes per record.

14. The computer-readable storage medium of claim 11, wherein the at least one pattern significance guideline includes at least one of attribute significance, row significance, and pattern significance.

15. The computer-readable storage medium of claim 11, wherein generating the plurality of similarity patterns comprises:
repeating the designating, comparing, and generating until each record in the target database has been designated as the test record once.

* * * * *